(12) United States Patent
Skinkle et al.

(10) Patent No.: US 9,368,264 B2
(45) Date of Patent: Jun. 14, 2016

(54) MAGNET KEEPER ASSEMBLY AND RELATED METHOD

(71) Applicant: Micro Motion, Inc., Boulder, CO (US)

(72) Inventors: David Skinkle, Boulder, CO (US); Terri J Mertens, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 52 days.

(21) Appl. No.: 14/479,600

(22) Filed: Sep. 8, 2014

(65) Prior Publication Data

US 2016/0071639 A1  Mar. 10, 2016

(51) Int. Cl.
*H01F 7/20* (2006.01)
*H01F 7/02* (2006.01)
*G01F 1/84* (2006.01)
*H01F 41/02* (2006.01)

(52) U.S. Cl.
CPC ............ *H01F 7/0221* (2013.01); *G01F 1/8413* (2013.01); *H01F 41/0253* (2013.01)

(58) Field of Classification Search
CPC ......... G01F 1/84; G01F 15/18; G01F 1/8404; G01F 1/8409; G01F 1/8468
USPC ........................................................ 335/285
See application file for complete search history.

(56) References Cited

U.S. PATENT DOCUMENTS

| | | | | | |
|---|---|---|---|---|---|
| 4,109,524 | A * | 8/1978 | Smith | .................... | G01F 1/8418 73/861.357 |
| 4,491,025 | A * | 1/1985 | Smith | .................... | G01F 1/8477 73/861.355 |
| 4,738,143 | A * | 4/1988 | Cage | .................... | G01F 1/8409 73/861.355 |
| 4,738,144 | A * | 4/1988 | Cage | .................... | G01F 1/8409 73/861.355 |
| 4,872,351 | A * | 10/1989 | Ruesch | .................... | G01F 1/74 73/861.04 |
| 4,876,898 | A * | 10/1989 | Cage | .................... | G01F 1/8409 73/861.355 |
| 5,349,872 | A * | 9/1994 | Kalotay | ................ | G01F 1/8413 73/861.355 |
| 5,663,509 | A * | 9/1997 | Lew | ...................... | G01F 1/8413 73/861.355 |
| 5,687,100 | A * | 11/1997 | Buttler | ................... | G01F 1/8413 702/100 |
| 5,987,998 | A * | 11/1999 | Campbell | ............. | G01F 1/8413 73/861.355 |
| 6,711,958 | B2 * | 3/2004 | Bitto | ...................... | G01F 1/8404 73/861.355 |
| 6,776,052 | B2 * | 8/2004 | Crisfield | ............... | G01F 1/8409 73/861.354 |
| 6,957,587 | B2 * | 10/2005 | Bitto | ...................... | G01F 1/8409 73/861.355 |
| 7,287,438 | B2 * | 10/2007 | Van Cleve | ............. | G01F 1/8413 73/861.355 |
| 7,325,461 | B2 * | 2/2008 | Bitto | ...................... | G01F 1/8409 73/861.355 |
| 7,363,689 | B2 * | 4/2008 | Bitto | ...................... | G01F 1/8409 29/445 |
| 7,709,987 | B2 | 5/2010 | Watanabe et al. | | |
| 7,845,242 | B2 * | 12/2010 | McAnally | ............. | G01F 1/8413 73/861.355 |
| 8,362,864 | B2 * | 1/2013 | Pankratz | ............... | G01F 1/8413 335/296 |
| 8,590,398 | B2 * | 11/2013 | Lanham | ................ | G01F 1/8409 73/861.355 |
| 9,200,937 | B2 * | 12/2015 | Werbach | ............... | G01F 1/8404 |
| 2007/0034019 | A1 * | 2/2007 | Doihara | ................ | G01F 1/8409 73/861.355 |
| 2007/0095151 | A1 * | 5/2007 | Kitami | .................. | G01F 1/8409 73/861.355 |
| 2010/0243619 | A1 * | 9/2010 | Currier | .................. | B23K 10/00 219/121.48 |
| 2011/0000315 | A1 * | 1/2011 | Tsubota | ................ | G01F 1/8418 73/861.357 |

* cited by examiner

*Primary Examiner* — Shawki S Ismail
*Assistant Examiner* — Lisa Homza
(74) *Attorney, Agent, or Firm* — The Ollila Law Group LLC

(57) ABSTRACT

A magnet assembly (200) is provided that comprises a magnet keeper (204) configured to hold at least one magnet (202). The bracket (208) is configured to receive the magnet keeper (204) and also configured to be attachable to a flowmeter (5) sensor assembly (10). A first surface (216) is formed on the magnet keeper (204), and a second surface (218) is formed on the bracket (208), wherein the first and second surfaces (216, 218) are configured to mate so to provide a radial alignment of the magnet keeper (204) that is within a predefined radial tolerance range.

10 Claims, 7 Drawing Sheets

MAGNET KEEPER ASSEMBLY AND RELATED METHOD

TECHNICAL FIELD

The present invention relates to sensors, and more particularly to a magnet keeper assembly for a vibrating sensor and related methods.

BACKGROUND OF THE INVENTION

Vibrating sensors, such as for example, vibrating densitometers and Coriolis Flowmeters are generally known, and are used to measure mass flow and other information related to materials flowing through a conduit in the flowmeter. Exemplary flowmeters are disclosed in U.S. Pat. No. 4,109,524, U.S. Pat. No. 4,491,025, and U.S. Pat. No. Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Some types of mass flowmeters, especially Coriolis flowmeters, are capable of being operated in a manner that performs a direct measurement of density to provide volumetric information through the quotient of mass over density. See, e.g., U.S. Pat. No. 4,872,351 to Ruesch for a net oil computer that uses a Coriolis flowmeter to measure the density of an unknown multiphase fluid. U.S. Pat. No. 5,687,100 to Buttler et al. teaches a Coriolis effect densitometer that corrects the density readings for mass flow rate effects in a mass flowmeter operating as a vibrating tube densitometer.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or with a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

The driver, as noted, often has a magnet mounted to a conduit with an opposing coil mounted to an opposing conduit. An alternating current is passed through the coil, which results in the vibrating of both conduits. The pickoffs are similarly constructed and oriented, except that they generate alternating current signals as a result of driver-produced vibrations that are detected by the pickoffs. Both drivers and pickoffs may have magnet keepers that are mounted to brackets which are typically welded or brazed onto the conduits. It would be ideal to braze the magnet keeper directly to the brackets, but the heat necessary to braze the brackets to the conduits may cause magnets within the magnet keeper to lose field strength. Post-magnetizing an entire flowmeter or sensor assembly is not practical. Therefore, the magnet keepers are attached to brackets that are pre-attached to conduits. Unfortunately, this attachment yields results in alignment inaccuracies due to the tolerances of the fasteners involved in the attachment. The present embodiments are directed to an apparatus and related methods to precisely attach magnet keepers to brackets, and thereby overcome these and other problems, and an advance in the art is achieved.

SUMMARY OF THE INVENTION

A magnet assembly is provided according to an embodiment. According to the embodiment, the magnet assembly comprises a magnet keeper configured to hold at least one magnet. A bracket is configured to receive the magnet keeper and configured to be attachable to a flowmeter sensor assembly. A first surface is formed on the magnet keeper, and a second surface is formed on the bracket, wherein the first and second surfaces are configured to mate so to provide a radial alignment of the magnet keeper that is within a predefined radial tolerance range.

A method of forming a magnet assembly is provided according to an embodiment. The embodiment comprises the steps of: threading a magnet keeper to define a first threaded region; threading a bracket that is configured to be attachable to a flowmeter sensor assembly to define a second threaded region, wherein the second threaded region is configured to engage the first threaded region; forming a first surface on the magnet keeper proximate the first threaded region; and forming a second surface on the bracket proximate the second threaded region, wherein the second surface is configured to engage the first surface when the magnet keeper is threaded to the bracket so to provide a radial alignment of the magnet keeper that is within a predefined radial tolerance range.

ASPECTS

According to an aspect, a magnet assembly is provided. The aspect comprises: a magnet keeper configured to hold at least one magnet; a bracket configured to receive the magnet keeper and configured to be attachable to a flowmeter sensor assembly; a first surface formed on the magnet keeper; and a second surface formed on the bracket, wherein the first and second surfaces are configured to mate so to provide a radial alignment of the magnet keeper that is within a predefined radial tolerance range.

Preferably, the first surface and second surface comprise a first set of mating diameters.

Preferably, the predefined radial tolerance range is between about 0.0 inches and 0.002 inches.

Preferably, the magnet assembly comprises a travel stop formed on the bracket; and a locating face formed on the magnet keeper and configured to engage the travel stop to provide an axial alignment of the magnet keeper that is within a predefined axial tolerance range.

Preferably, the predefined axial tolerance range is between about 0.0 inches and 0.005 inches.

Preferably, the magnet assembly comprises a first threaded region formed on the magnet keeper and disposed proximate the first surface; and a second threaded region formed on the bracket and disposed proximate the second surface, and being configured to engage the first threaded region.

Preferably, the second surface is disposed proximate a distal end of the bracket.

Preferably, the magnet assembly comprises: a third surface formed on the magnet keeper and disposed proximate the first threaded region; and a fourth surface formed on the bracket and disposed proximate, and proximal to, the second threaded region, wherein the fourth surface engages the third surface when the first and second threaded regions are engaged, and wherein the engagement of the third and fourth surfaces provides a radial alignment of the magnet keeper that is within the predefined radial tolerance range.

Preferably, the third surface and fourth surface comprise a second set of mating diameters.

Preferably, the first set of mating diameters are smaller than the second set of mating diameters.

Preferably, the magnet assembly comprises a thread relief defined by the bracket and disposed adjacent to the second threaded region.

According to an aspect a method of forming a magnet assembly is provided. The aspect comprises the steps of: threading a magnet keeper to define a first threaded region; threading a bracket that is configured to be attachable to a flowmeter sensor assembly to define a second threaded region, wherein the second threaded region is configured to engage the first threaded region; forming a first surface on the magnet keeper proximate the first threaded region; and forming a second surface on the bracket proximate the second threaded region, wherein the second surface is configured to engage the first surface when the magnet keeper is threaded to the bracket so to provide a radial alignment of the magnet keeper that is within a predefined radial tolerance range.

Preferably, the second surface is disposed proximate a distal end of the bracket.

Preferably, the predefined radial tolerance range is between about 0.0 inches and 0.002 inches.

Preferably, the aspect comprises the steps of: forming a third surface on the magnet keeper proximate the first threaded region; and forming a fourth surface on the bracket proximal to the bracket's threads, wherein the fourth surface is configured to engage the third surface when the magnet keeper is threaded to the bracket so to provide a radial alignment of the magnet keeper that is within a predefined radial tolerance range.

Preferably, the first surface and second surface comprise a first set of mating diameters.

Preferably, the third surface and fourth surface comprise a second set of mating diameters.

Preferably, the first set of mating diameters are smaller than the second set of mating diameters.

Preferably, the aspect comprises the steps of: forming a first thread relief in the bracket disposed proximate a distal end of the threads; and forming a second thread relief in the bracket disposed proximate a proximal end of the threads.

Preferably, the aspect comprises the step of forming a travel stop on the bracket.

Preferably, the aspect comprises the step of forming a locating face on the magnet keeper configured to engage the travel stop to provide an axial alignment of the magnet keeper that is within a predefined axial tolerance.

Preferably, the predefined axial tolerance is between about 0.0 inches and 0.005 inches.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention and that the features described below can be combined in various ways to form multiple variations of the invention. As a result, the invention is not limited to the specific examples described below, but only by the claims and their equivalents.

Figure 1:
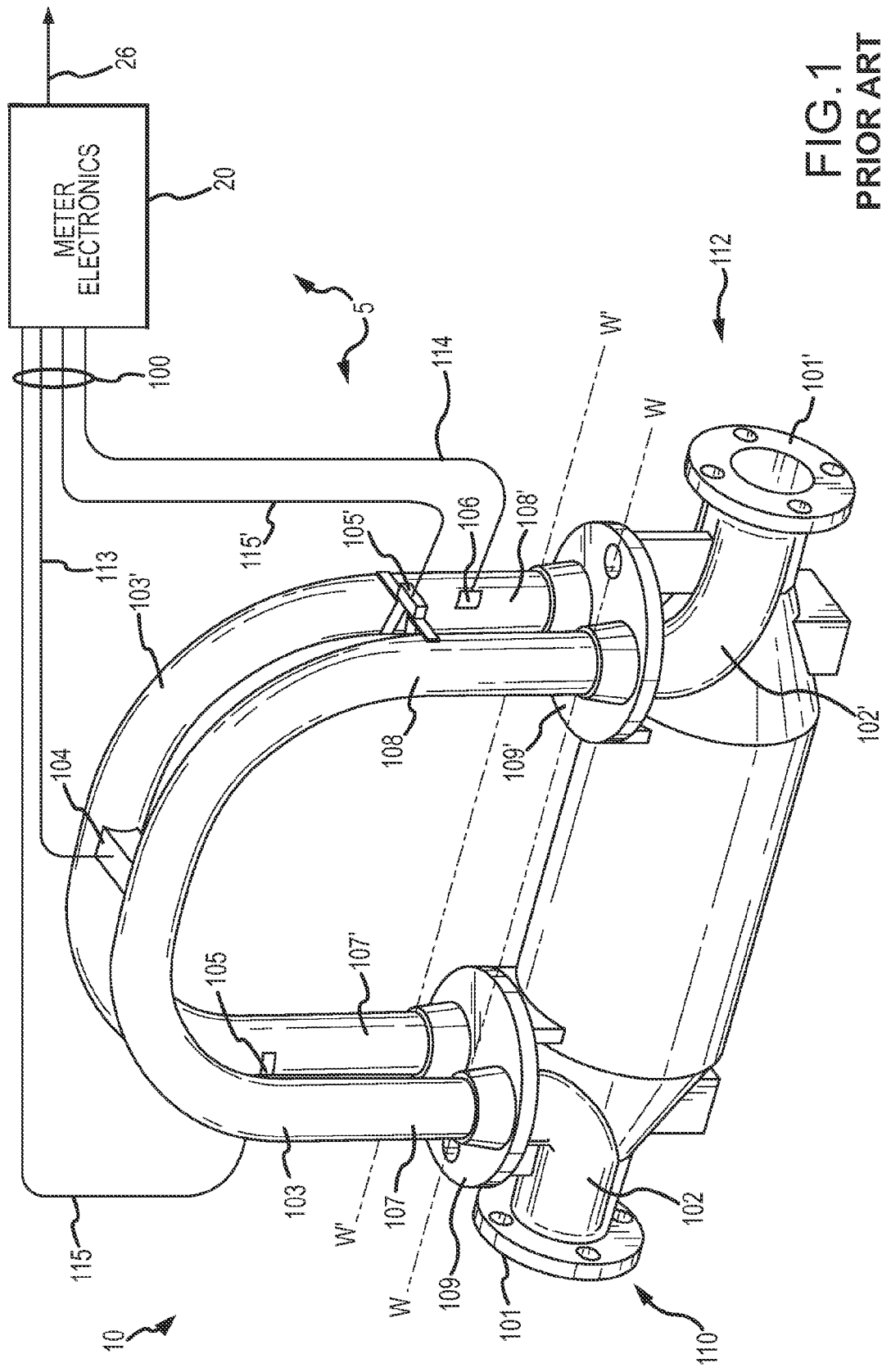
FIG. 1 shows a prior art flowmeter.

FIG. 1 illustrates a prior art flowmeter 5, which can be any vibrating meter, such as a Coriolis flowmeter or densitometer, for example without limitation. The flowmeter 5 comprises a sensor assembly 10 and meter electronics 20. The sensor assembly 10 responds to mass flow rate and density of a process material. Meter electronics 20 are connected to the sensor assembly 10 via leads 100 to provide density, mass flow rate, and temperature information over path 26, as well as other information. The sensor assembly 10 includes flanges 101 and 101', a pair of manifolds 102 and 102', a pair of parallel conduits 103 (first conduit) and 103' (second conduit), a driver 104, a temperature sensor 106 such as a resistive temperature detector (RTD), and a pair of pickoffs 105 and 105', such as magnet/coil pickoffs, strain gages, optical sensors, or any other pickoff known in the art. The conduits 103 and 103' have inlet legs 107 and 107' and outlet legs 108 and 108', respectively. Conduits 103 and 103' bend at least one symmetrical location along their length and are essentially parallel throughout their length. Each conduit 103, 103', oscillates about axes W and W', respectively.

The legs 107, 107', 108, 108' of conduits 103,103' are fixedly attached to conduit mounting blocks 109 and 109' and these blocks, in turn, are fixedly attached to manifolds 102 and 102'. This provides a continuous closed material path through the sensor assembly 10.

When flanges 101 and 101' are connected to a process line (not shown) that carries the process material that is being measured, material enters a first end 110 of the flowmeter 5 through a first orifice (not visible in the view of FIG. 1) in flange 101 and is conducted through the manifold 102 to the conduit mounting block 109. Within the manifold 102, the material is divided and routed through conduits 103 and 103'. Upon exiting conduits 103 and 103', the process material is recombined in a single stream within manifold 102' and is thereafter routed to exit a second end 112 connected by flange 101' to the process line (not shown).

Conduits 103 and 103' are selected and appropriately mounted to the conduit mounting blocks 109 and 109' so as to have substantially the same mass distribution, moments of inertia, and Young's modulus about bending axes W-W and W'-W', respectively. Inasmuch as the Young's modulus of the conduits 103, 103' changes with temperature, and this change affects the calculation of flow and density, a temperature sensor 106 is mounted to a conduit 103, 103' to continuously measure the temperature of the conduit. The temperature of the conduit, and hence the voltage appearing across the temperature sensor 106 for a given current passing therethrough, is governed primarily by the temperature of the material passing through the conduit. The temperature-dependent voltage appearing across the temperature sensor 106 is used in a well-known method by meter electronics 20 to compensate for the change in elastic modulus of conduits 103, 103' due to any changes in conduit 103, 103' temperature. The temperature sensor 106 is connected to meter electronics 20.

Both conduits 103, 103' are driven by a driver 104 in opposite directions about their respective bending axes W and W' at what is termed the first out-of-phase bending mode of the flowmeter 5. The driver 104 may comprise any one of many well-known arrangements, such as a magnet mounted to a conduit 103' and an opposing coil mounted to a conduit 103, through which an alternating current is passed for vibrating both conduits. A suitable drive signal is applied by meter electronics 20, via lead 113, to the driver 104. It should be appreciated that while the discussion is directed towards two conduits 103, 103', in other embodiments, only a single conduit may be provided. It is also within the scope of the present invention to produce multiple drive signals for multiple drivers.

Meter electronics 20 receive the temperature signal on lead 114, and the left and right velocity signals appearing on leads 115 and 115', respectively. Meter electronics 20 produce the drive signal appearing on lead 113 to driver 104 and vibrate conduits 103, 103'. Meter electronics 20 process the left and right velocity signals and the temperature signal to compute the mass flow rate and the density of the material passing through sensor assembly 10. This information, along with other information, is applied by meter electronics 20 over path 26 to utilization means. An explanation of the circuitry of the meter electronics 20 is not needed to understand the present invention and is omitted for brevity of this description. It should be appreciated that the description of FIG. 1 is provided merely as an example of the operation of one possible vibrating meter and is not intended to limit the teaching of the present invention.

A Coriolis flowmeter structure is described although it will be apparent to those skilled in the art that the present invention could be practiced on a vibrating tube densitometer without the additional measurement capability provided by a Coriolis mass flowmeter. In fact, the present invention may be utilized in pipelines, conduits, flanges, of all sizes, with or without means for measuring mass flow, density, etc.

Figure 2:
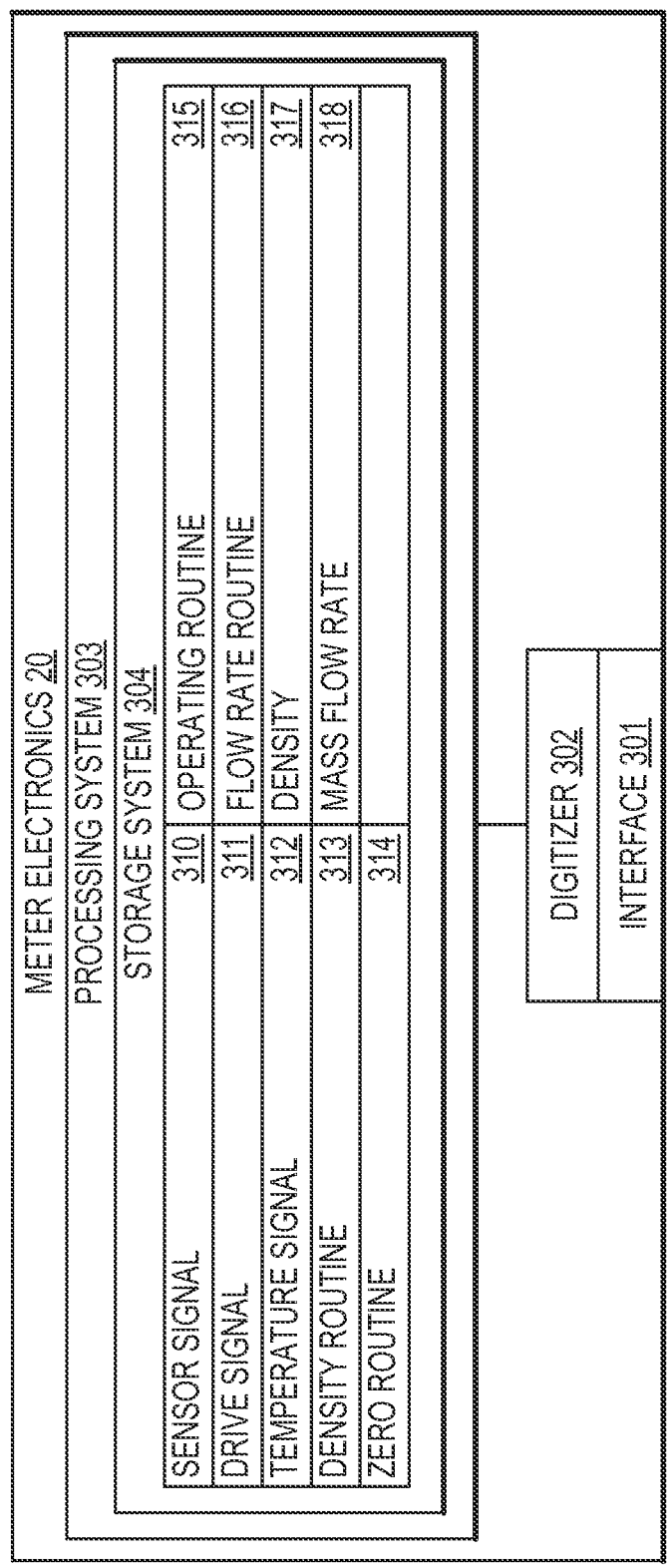
FIG. 2 shows a prior art meter electronics.

FIG. 2 illustrates an example of prior art meter electronics 20. The meter electronics 20 can include an interface 301 and a processing system 303. The processing system 303 may include a storage system 304. The storage system 304 may comprise an internal memory, and/or may comprise an external memory. The meter electronics 20 can generate a drive signal 311 and supply the drive signal 311 to the driver 104. In addition, the meter electronics 20 can receive sensor signals 310 from the sensor assembly 10, such as pickoff/velocity sensor signals, strain signals, optical signals, temperature signals, or any other signals known in the art. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present invention. The meter electronics 20 can process the sensor signals 310 in order to obtain flow characteristics of the material flowing through the flow conduits 103, 103'. In some embodiments, the meter electronics 20 may receive a temperature signal 312 from one or more RTD sensors or other temperature sensors 106, for example.

The interface 301 can receive the sensor signals 310 from the driver 104 or pickoffs 105, 105', via leads 113, 115, 115', respectively. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 20 and external devices. The interface 301 can be capable of any manner of electronic, optical, or wireless communication.

The interface 301 in one embodiment can include a digitizer 302, wherein the sensor signal comprises an analog sensor signal. The digitizer 302 can sample and digitize the analog sensor signal and produce a digital sensor signal. The digitizer 302 can also perform any needed decimation, wherein the digital sensor signal is decimated in order to reduce the amount of signal processing needed and to reduce the processing time.

The processing system 303 can conduct operations of the meter electronics 20 and process flow measurements from the sensor assembly 10. The processing system 303 can execute one or more processing routines, such as a density routine 313, a zero routine 314, an operating routine 315, and a flow rate routine 316 for example without limitation. According to an embodiment, the meter electronics 20 can also measure a temperature signal 312, and associate that temperature with the flow rates captured at a given temperature.

The flowmeter 5 may generate a density 317. A mass flow rate 318 or the density 317 may be calculated, for example, as part of the operating routine 315. In an embodiment, the temperature signal 312 is read and a zero-flow rate is also saved and calculated as part of the zero routine 314. A calibrated meter zero improves calculation accuracy.

The processing system 303 can comprise a general purpose computer, a micro-processing system, a logic circuit, or some other general purpose or customized processing device. The processing system 303 can be distributed among multiple processing devices. The processing system 303 can include any manner of integral or independent electronic storage medium, such as the storage system 304.

The processing system 303 processes the sensor signal 310 in order to generate the drive signal 311, among other things. The drive signal 311 is supplied to the driver 104 in order to vibrate the associated conduit(s), such as the conduits 103, 103' of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

Figure 3:
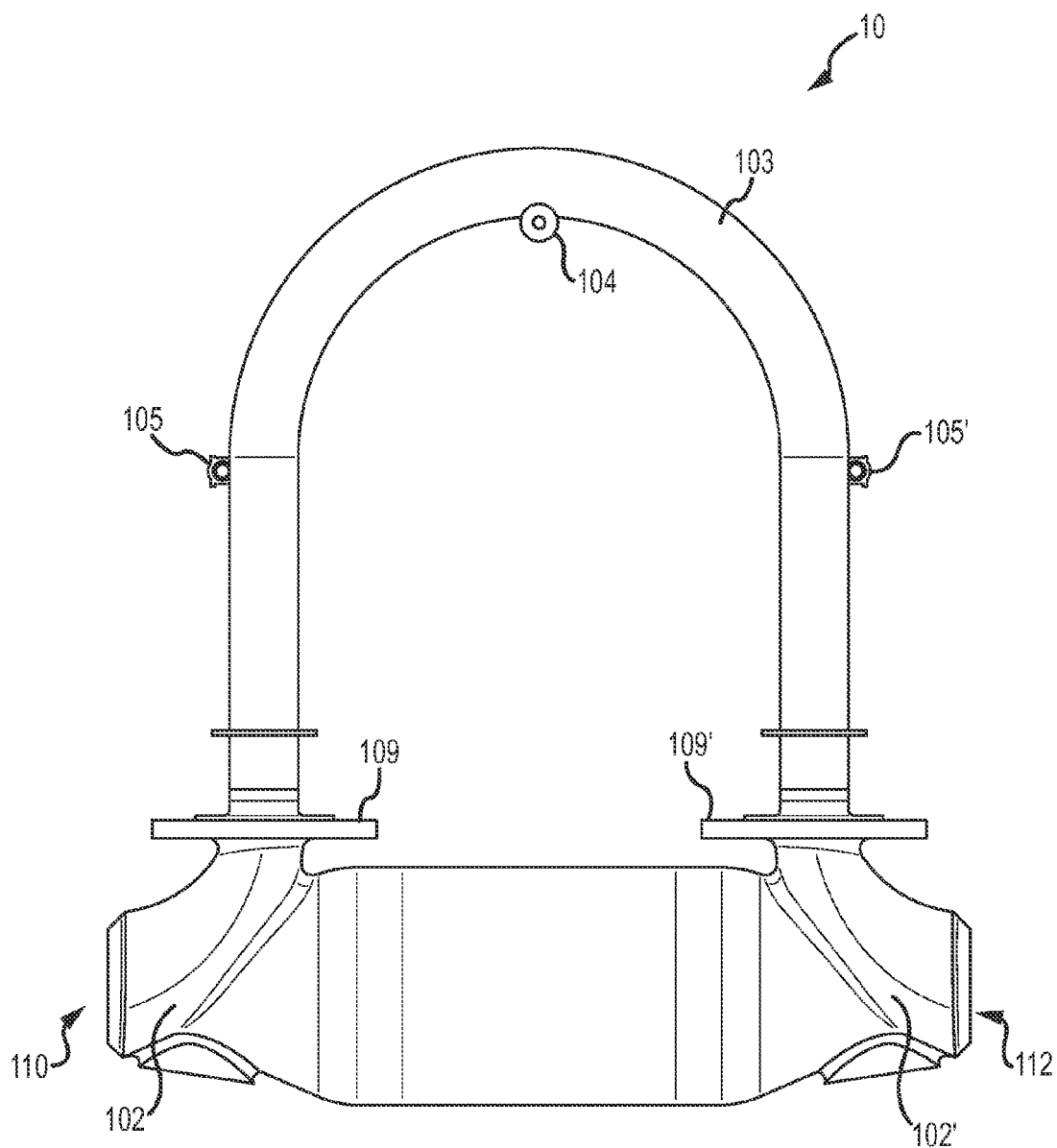
FIG. 3 shows a sensor assembly according to an embodiment.
Figure 4:
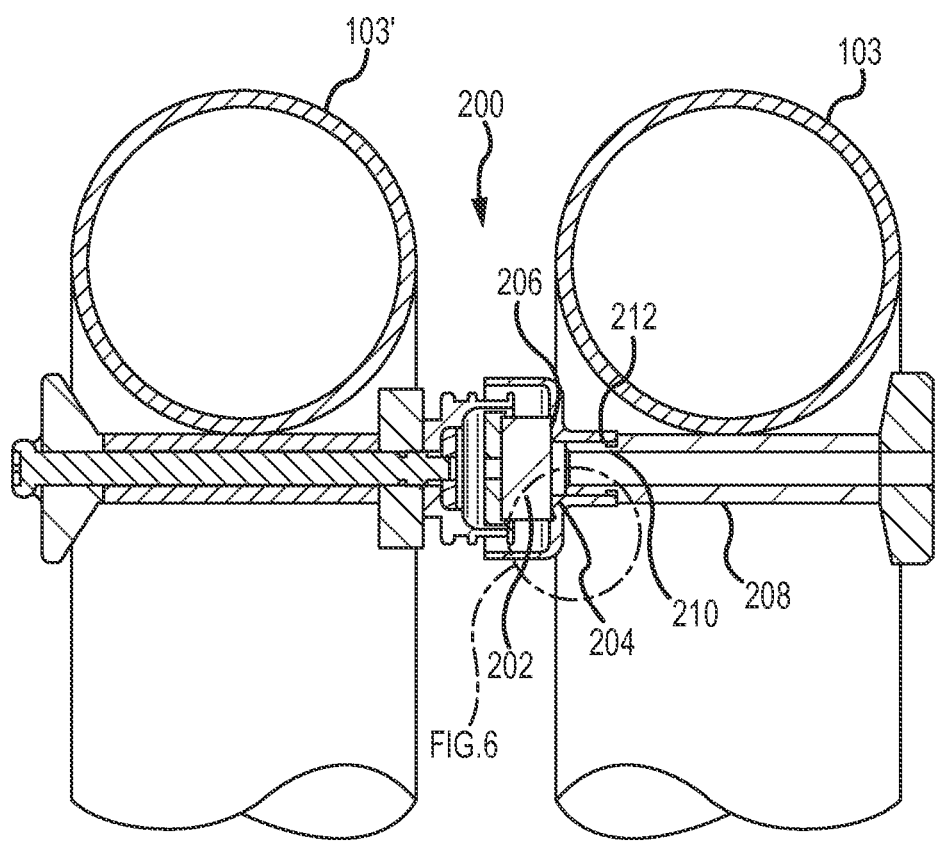
FIG. 4 is a cross-section of the sensor assembly of FIG. 3.

FIG. 3 shows a sensor assembly 10 according to an embodiment. A driver 104 and pickoffs 105, 105' are illustrated. Since the driver 104 and pickoffs 105, 105' are constructed as coil/magnet combinations, they will collectively be referred to as magnet assemblies 200. FIG. 4 is a cross-sectional view of a magnet assembly 200. The magnet assembly 200, according to an embodiment, includes at least one magnet 202 and a magnet keeper 204. The magnet 202 in the embodiment shown is substantially cylindrical. However, other magnet shapes can be employed. The magnet 202 can be composed of one or more magnets. The magnet 202 can comprise a stack of magnets that are attached together, for example. The magnet 202 in one embodiment comprises a samarium cobalt (SmCo) magnet. A SmCo magnet substantially retains its magnetic properties at high temperatures and therefore is advantageous in use with a flow meter that receives a high temperature flow material. For example, at or above 400° F., a SmCo magnet can generate a satisfactory level of the magnetic flux needed to operate in a magnet assembly 200. However, it should be understood that other magnet materials can be used and are within the scope of the description and claims, such as an AlNiCo magnet, for example, without limitation. Additionally, the magnet may be coated or plated, according to needs. In an embodiment, the magnet 202 is nickel-plated.

Figure 5:
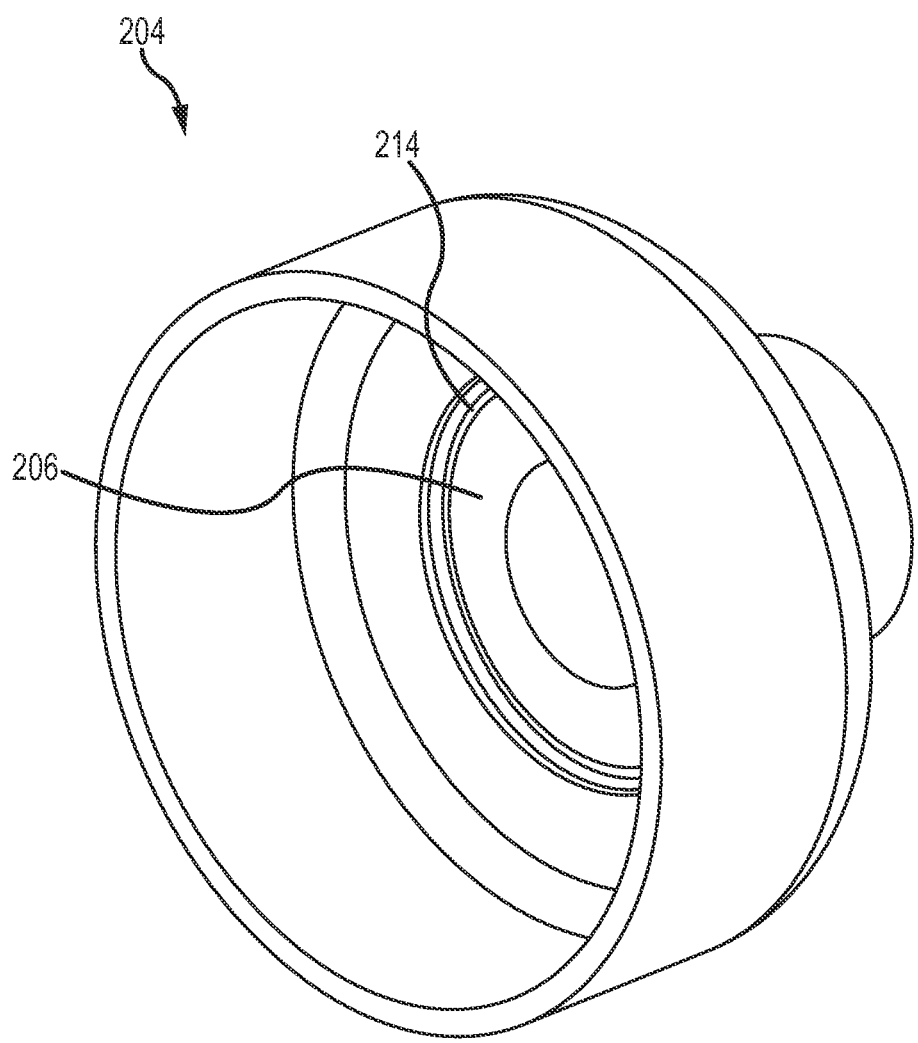
FIG. 5 illustrates a magnet keeper according to an embodiment.

With continuing reference to FIGS. 3-4 and also FIG. 5, the magnet keeper 204 comprises a first threaded region 210. In an embodiment, the first threaded region 210 is oriented orthogonally to a magnet-receiving face 206. The first threaded region 210 is formed with the magnet keeper 204, and in an embodiment is machined. A bracket 208 is attachable to the conduit 103. The bracket 208 may be brazed or welded to the conduit 103 in an embodiment. However, it should be understood that the bracket 208 can affix to a flowmeter 5 structure, and more particularly a sensor assembly 10 structure, in any manner. The bracket 208, in the embodiment shown, includes a second threaded region 212. The first and second threaded regions 210, 212 are complementary, and are used to removably affix the magnet keeper 204 to the bracket 208. It should be understood, however, that the magnet keeper 204 can be attached to the bracket 208 in any manner. For threaded embodiments, the threads may be ISO metric threads, unified inch screw threads, pipe threads, taper pipe threads, American pipe threads, ACME threads, trapezoidal threads, buttress screw threads, round threads, and any other thread known in the art.

Figure 6:
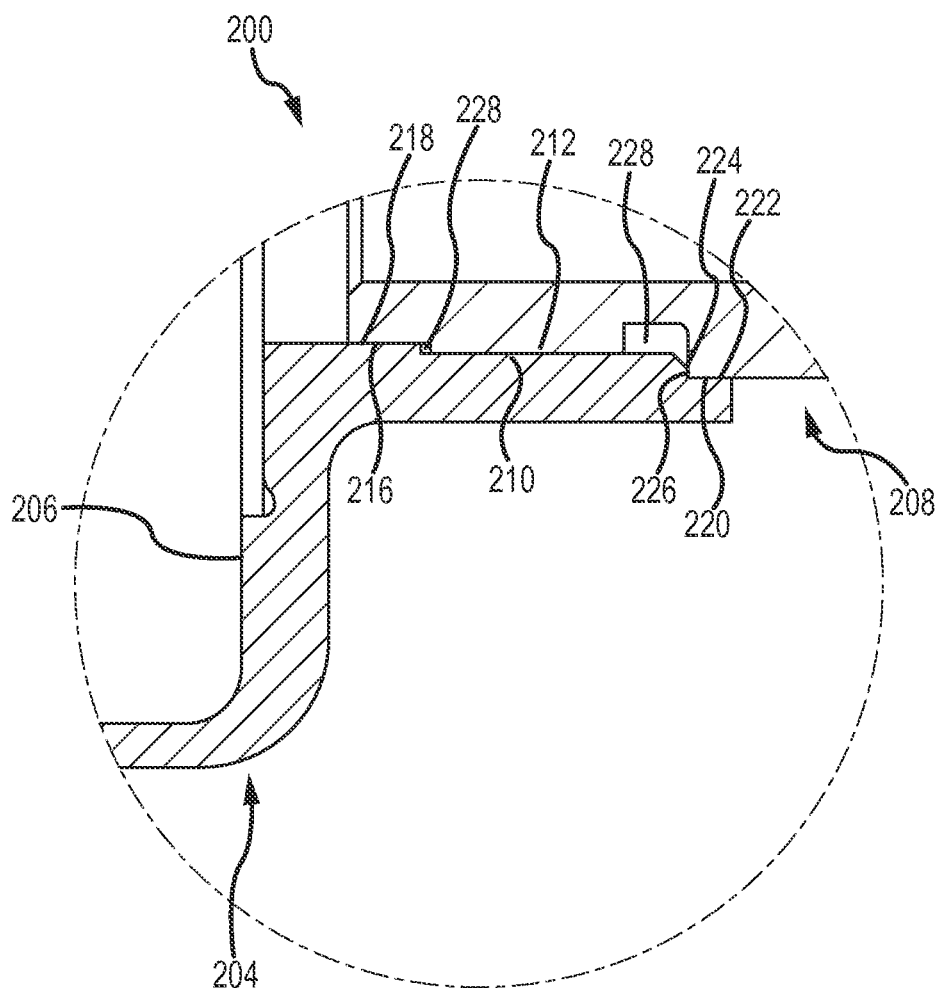
FIG. 6 is a cross-section of a magnet assembly according to an embodiment.

FIGS. 4-5 and FIG. 6 show the magnet keeper 204 according to an embodiment. In this embodiment, the magnet-receiving face 206 includes a countersink region 214 that is configured to receive the magnet 202. The countersink region 214 aids in aligning and assembling the magnet 202. The countersink region 214 can advantageously function to center the magnet 202 on the magnet keeper 204. In addition, the countersink region 214 can provide more area for attaching the magnet 202 to the magnet keeper 204. The countersink region 214 can substantially match the shape of the magnet 202.

The magnet assembly 200, according to any embodiment, can be constructed in various manners. In one method, the magnet 202 is placed against the magnet-receiving face 206 of the magnet keeper 204 and brazed in place. In another method, the magnet 202 is placed within the countersink region 214 of the magnet keeper 204 and brazed in place. In another method, the magnet 202 is plated (such as with nickel, for example without limitation) into place as a means of affixing the parts together. Magnet keepers 204 and magnets 202 subjected to heat during the attachment process, such as for magnets 202 brazed or plated into place, for example without limitation, may then be subjected to a re-magnetization process to restore magnetic capacity lost due to the heat of attachment processes.

In prior art embodiments, a magnet keeper is attached to a bracket with a fastener, such as a threaded bolt, for example. Unfortunately, the typical run-out for a thread-form is in the range of about 0.007 inches to 0.012 inches, which results in a relatively poor radial alignment. In an embodiment, the radial alignment of the magnet keeper 204 is within a predefined radial tolerance range. In an embodiment, the predefined radial tolerance range is between about 0.0 in. and 0.005 inches. In a related embodiment, the predefined radial tolerance range is between about 0.0 in. and 0.002 inches. To accomplish such tight tolerances, mating indexing surfaces are employed. In an embodiment, a first surface 216 is formed on the magnet keeper 204, and this surface is configured to engage a complementary second surface 218 formed on the bracket 208. A precise fit between the first and second surfaces 216, 218 facilitates the above-noted tight radial tolerance ranges. In an embodiment, the first and second surfaces 216, 218 are round, and comprise a first set of mating diameters, as is illustrated in FIGS. 4 and 6. Additionally, the second surface 218 may be oriented distally to the second threaded region 212, such that the magnet keeper 204 will, upon installation, be mostly threaded or otherwise attached to the bracket 208 before the first and second surfaces 216, 218 engage.

In an embodiment, a third surface 220 is formed on the magnet keeper 204, and this surface is configured to engage with a complementary fourth surface 222 formed on the bracket 208. A precise fit between the third and fourth surfaces 220, 222 also aids in facilitating the above-noted tight radial tolerance ranges. In an embodiment, the third and fourth surfaces 220, 222 are round, and comprise a second set of mating diameters, as is illustrated in FIGS. 4 and 6. The fourth surface 222 may be oriented proximally to the second threaded region 212, such that the third and fourth surfaces 220, 222 will, upon installation, be engaged before the magnet keeper 204 is fully threaded or otherwise attached to the bracket 208. The first and second set of mating diameters may be the same diameter or different diameters. In an embodiment, the first set of mating diameters are smaller than the second set of mating diameters.

To facilitate precise fitment of the first and second surfaces 216, 218 and third and fourth surfaces 220, 222, a thread relief 228 may be formed on the bracket 208 proximate each terminus of the second threaded region 212. This ensures that radii associated with threaded surfaces do not interfere with the radial alignment of the magnet keeper 204 in relation to the bracket 208. In an embodiment, there is a single thread relief 228, and in another embodiment, there are two thread reliefs 228.

Besides radial alignment, axial alignment of the magnet keeper 204 is a consideration. For this reason, in an embodiment, a travel stop 224 is formed on the bracket 208. The travel stop 224 is positioned such that it defines a datum from which axial tolerances may be referenced. A locating face 226 formed on the magnet keeper 204 is configured to index against the travel stop 224 upon installation of the magnet keeper 204 onto the bracket 208 such that the axial position of the magnet keeper 204 is within a predefined axial tolerance range. In an embodiment, the predefined axial tolerance range is between about 0.0 in. and 0.005 inches.

Figure 7:
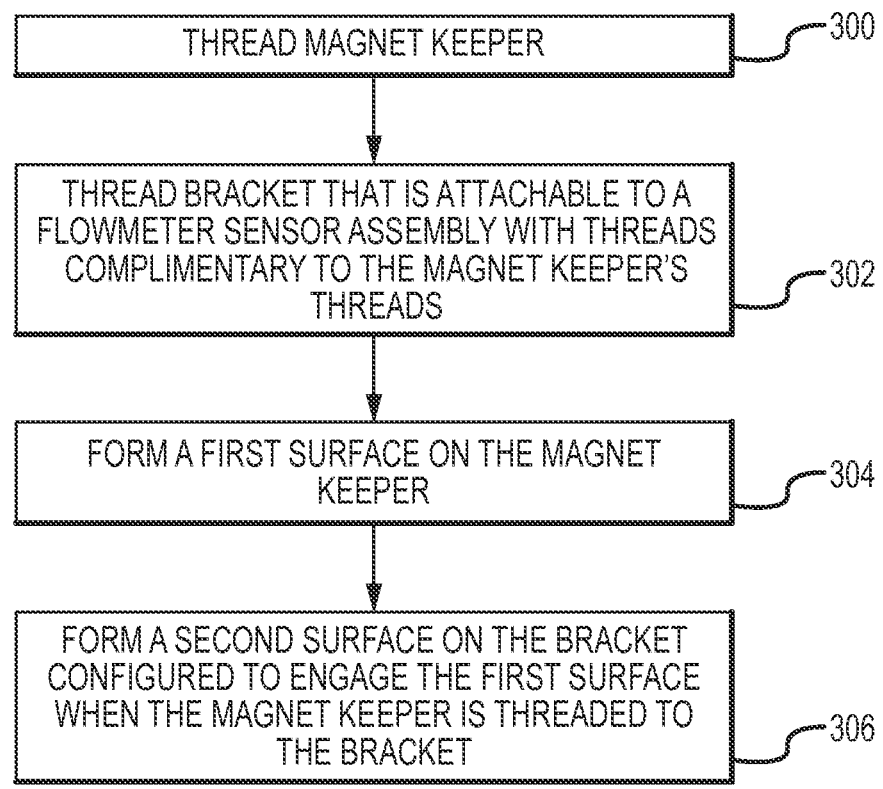
FIG. 7 is a flow chart illustrating a method according to an embodiment.

Turning to FIG. 7, a method of forming a magnet assembly is provided according to an embodiment. In step 300, a magnet keeper 204 is threaded so to define a first threaded region 210. The bracket 208 is also threaded, as shown in step 302, to define a second threaded region 212. The second threaded region 212 and first threaded region 210 are configured to engage each other. The bracket 208 is also configured to be attachable to a flowmeter 5 sensor assembly 10. The bracket 208 is brazed or welded to the conduit 103 in an embodiment. It should be understood that the bracket 208 can be affixed to a flowmeter 5 structure, such as the sensor assembly 10, for example, in any manner known in the art.

In step 304, a first surface 216 is formed on the magnet keeper 204 proximate the first threaded region 210. This surface is complementary to a second surface 218. In step 306, a second surface 218 is formed on the bracket 208 proximate the second threaded region 212. As these surfaces are complementary, they are configured to engage each other when the magnet keeper 204 is threaded onto the bracket 208. In an embodiment, the second surface 218 is disposed proximate a distal end of the bracket 208. These mating surfaces foster a radial alignment of the magnet keeper 204 that is within a predefined tolerance range. In an embodiment, the predefined radial tolerance range is between about 0.0 inches and 0.002 inches. In an embodiment, the first and second surfaces 216, 218 are shaped to form a first set of mating diameters.

In a related embodiment of a method, a third surface 220 is formed on the magnet keeper 204 proximate the first threaded region 210, and a fourth surface 222 is formed on the bracket 208 proximal to the bracket's threads. Similar to the first and second surfaces 216, 218, the third and fourth surfaces 220, 222 are configured to engage each other when the magnet keeper 204 is threaded to the bracket 208, and this similarly provides a radial alignment of the magnet keeper 204 that is within a predefined tolerance range. In an embodiment, the third surface and fourth surface 220, 222 comprise a second set of mating diameters. It is contemplated that the first set of mating diameters may be smaller than the second set of mating diameters.

In embodiments of a method of forming a magnet assembly, a thread relief 228 in the bracket 208 is formed proximate a distal end of the second threaded region 212. Additionally, a thread relief 228 may be formed on the bracket 208 proximate a proximal end of the second threaded region 212. A travel stop 224 may be formed on the bracket 208 in an embodiment. The travel stop 224 is situated such that a locating face 226 may engage the travel stop 224. The locating face 226 is formed on the magnet keeper 204 in an embodiment. The travel stop 224 and locating face 226 are configured to engage each other to provide an axial alignment of the magnet keeper 204 that is within a predefined axial tolerance. In an embodiment of a method, the predefined axial tolerance is between about 0.0 inches and 0.005 inches.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

We claim:

1. A magnet assembly (200) comprising:
   a magnet keeper (204) configured to hold at least one magnet (202);
   a bracket (208) configured to receive the magnet keeper (204) and configured to be attachable to a flowmeter (5) sensor assembly (10);
   a first surface (216) formed on the magnet keeper (204); and
   a second surface (218) formed on the bracket (208), wherein the first and second surfaces (216, 218) are configured to mate so to provide a radial alignment of the magnet keeper (204) that is within a predefined radial tolerance range
   a travel stop (224) formed on the bracket (208); and
   a locating face (226) formed on the magnet keeper (204) and configured to engage the travel stop (224) to provide an axial alignment of the magnet keeper (204) that is within a predefined axial tolerance range.

2. The magnet assembly (200) of claim 1, wherein the first surface (216) and second surface (218) comprise a first set of mating diameters.

3. The magnet assembly (200) of claim 1, wherein the predefined radial tolerance range is between about 0.0 inches and 0.002 inches.

4. The magnet assembly (200) of claim 1, wherein the predefined axial tolerance range is between about 0.0 inches and 0.005 inches.

5. The magnet assembly (200) of claim 2, comprising:
   a first threaded region (210) formed on the magnet keeper (204) and disposed proximate the first surface (216); and
   a second threaded region (212) formed on the bracket (208) and disposed proximate the second surface (218), and being configured to engage the first threaded region (210).

6. The magnet assembly (200) of claim 1, wherein the second surface (218) is disposed proximate a distal end of the bracket (208).

7. The magnet assembly (200) of claim 5, comprising:
   a third surface (220) formed on the magnet keeper (204) and disposed proximate the first threaded region (210); and
   a fourth surface (222) formed on the bracket (208) and disposed proximate, and proximal to, the second threaded region (212), wherein the fourth surface (222) engages the third surface (220) when the first and second threaded regions (210, 212) are engaged, and wherein the engagement of the third and fourth surfaces (220, 222) provides a radial alignment of the magnet keeper (204) that is within the predefined radial tolerance range.

8. The magnet assembly (200) of claim 7, wherein the third surface (220) and fourth surface (222) comprise a second set of mating diameters.

9. The magnet assembly (200) of claim 8, wherein the first set of mating diameters are smaller than the second set of mating diameters.

10. The magnet assembly (200) of claim 5, comprising:
    a thread relief (228) defined by the bracket (208) and disposed adjacent to the second threaded region (212).

* * * * *